United States Patent [19]

Koch

[11] Patent Number: 4,785,570
[45] Date of Patent: Nov. 22, 1988

[54] CASTING AID

[76] Inventor: Alexander W. Koch, P.O. Box 847, Winchester, Oreg. 97495

[21] Appl. No.: 171,418

[22] Filed: Mar. 21, 1988

[51] Int. Cl.⁴ ............................................. A01K 83/00
[52] U.S. Cl. .................................. 43/43.12; 43/44.81; 43/44.88
[58] Field of Search ................. 43/43.12, 42.04, 44.88, 43/44.81, 42.74, 43.1, 41.2

[56] References Cited

U.S. PATENT DOCUMENTS 2,830,400  4/1958  Perry .................................. 43/43.12
3,318,036  5/1967  McGuire ........................... 43/44.88
3,897,648  8/1975  Neary ................................ 43/43.12

Primary Examiner—Nicholas P. Godici
Assistant Examiner—Karen Skillman
Attorney, Agent, or Firm—Eugene M. Eckelman

[57] ABSTRACT

An aid for attachment to a fish line to facilitate casting a lightweight lure or bait a substantial distance. The aid includes a body member having a slot connection to a disposable weight for separation when submerged under the action of a buoyant body on the aid. The body member has structure facilitating use either as a disposable unit or a non-disposable unit, depending upon the desire of the fisherman.

10 Claims, 1 Drawing Sheet

CASTING AID

BACKGROUND OF THE INVENTION

This invention relates to new and useful improvements in an aid of a type arranged to be attached to a fishing line to facilitate casting.

In my U.S. Pat. No. 4,638,587, a casting aid is provided which has temporary attachment to a fish line for the purpose of casting a lure or bait selected distances, including long distances. Such casting aid employs a body member having a hook-shaped arm at one end for releasable engagement with a fishing line. The structure also employs a casting weight and a buoyant member, the latter member upon being submerged rotating the body member on a fulcrum provided by the casting weight in an arrangement that disengages the hook-shaped arm from the fishing line. By means of such structure, an inexpensive weight is arranged to be tied to the casting aid, and after the cast has been made and submerged, the entire aid separates from the fishing line and is thus always disposable. Although a releasable weight casting apparatus has heretofore been provided, namely, U.S. Pat. No. 2,687,592, the disposable casting aid and the buoyant operating portion of my U.S. Pat. No. 4,638,587 constituted a substantial improvement in the art.

SUMMARY OF THE INVENTION

According to the present invention and forming a primary objective thereof, a casting aid is provided which has improved features over prior devices, namely, it has means facilitating use thereof either as a disposable or a non-disposable aid.

Another object is to provide a casting aid which employs an abutment on its body member which prevents entanglement of the weight with portions of the body member during a cast.

In achieving such objects, an elongated body member has releasable fishing line attaching means at its rearward end which are capable of releasing the body member from the fishing line after the body member is submerged. The casting weight is releasably attached intermediate the ends of the body member. Importantly, the device comprises auxiliary fishing line attaching means disposed intermediate the rear fishing line attaching means and the weight attaching means which allows permanent attachment of the casting aid to the fish line if desired, whereby to provide a choice for the fisherman of employing the casting aid as a disposable one by using the releasable fishing line attaching means or a non-disposable one by using the auxiliary fishing line attaching means. The body member has a relief portion intermediate the auxiliary fishing line attaching means and the rear fishing line attaching means which allows the latter to be broken off in the non-disposable use of the casting aid. The invention furthermore employs an abutment on the body member which maintains the weight assembly in spaced relation from other portions of the body member The invention will be better understood and additional objects and advantages will become apparent from the following description taken in connection with the accompanying drawings.

DETAILED DESCRIPTION OF A PREFERRED EMBODIMENT

Figure 1:
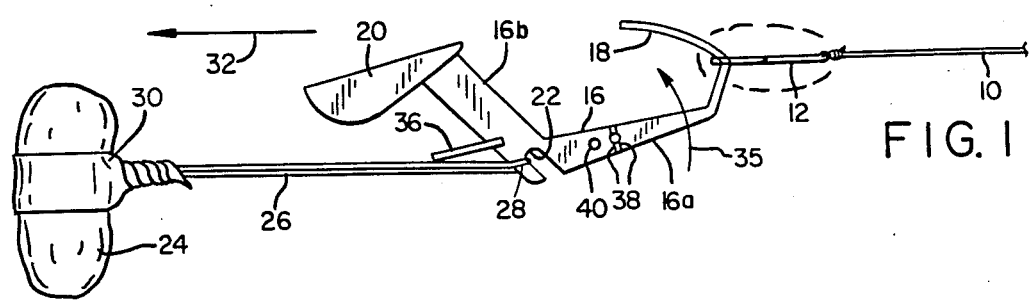
FIG. 1 is an elevational view of the present aid, this view showing the aid attached to a fishing line for disposable use and operative in a casting function.
Figure 2:
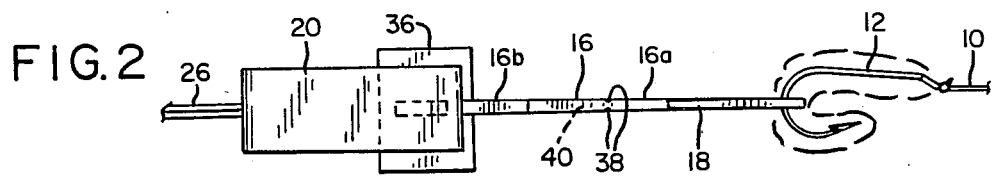
FIG. 2 is a fragmentary top plan view of the casting aid.
Figure 4:
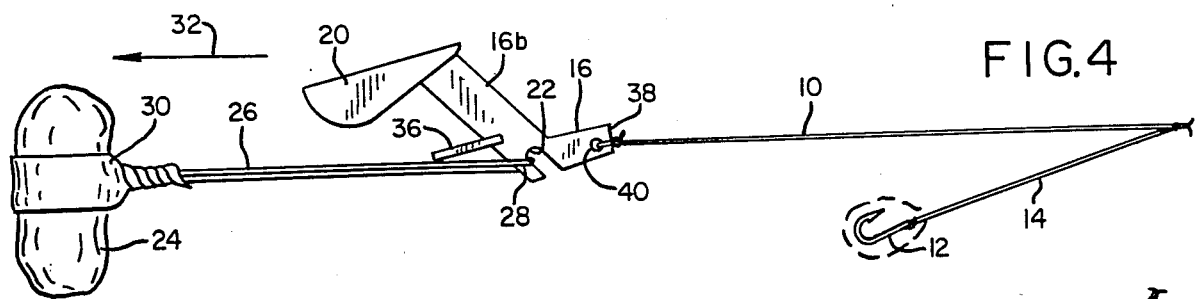
FIG. 4 is a side elevational view taken similar to FIG. 1 but showing the aid attached to a fishing line for non-disposable use.
Figure 3:
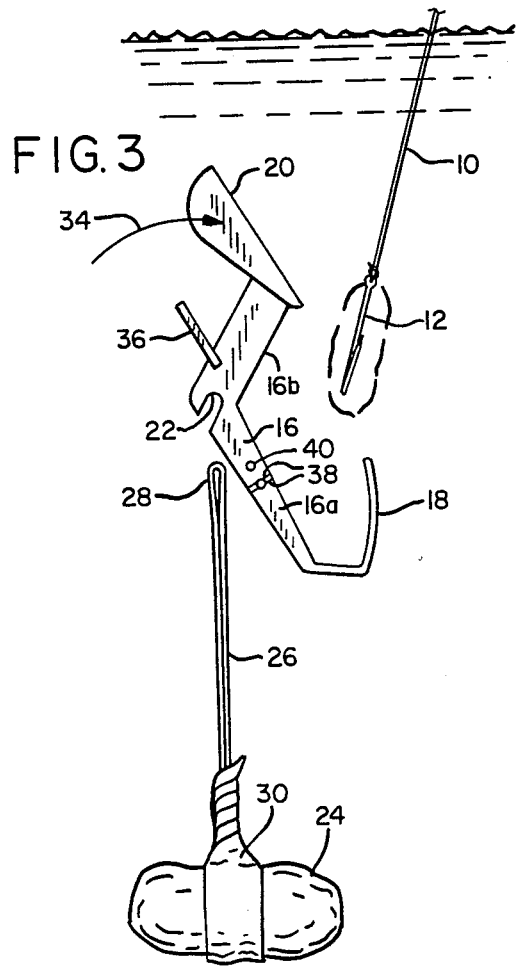
FIG. 3 is a view showing the parts in their release function when submerged.
Figure 5:
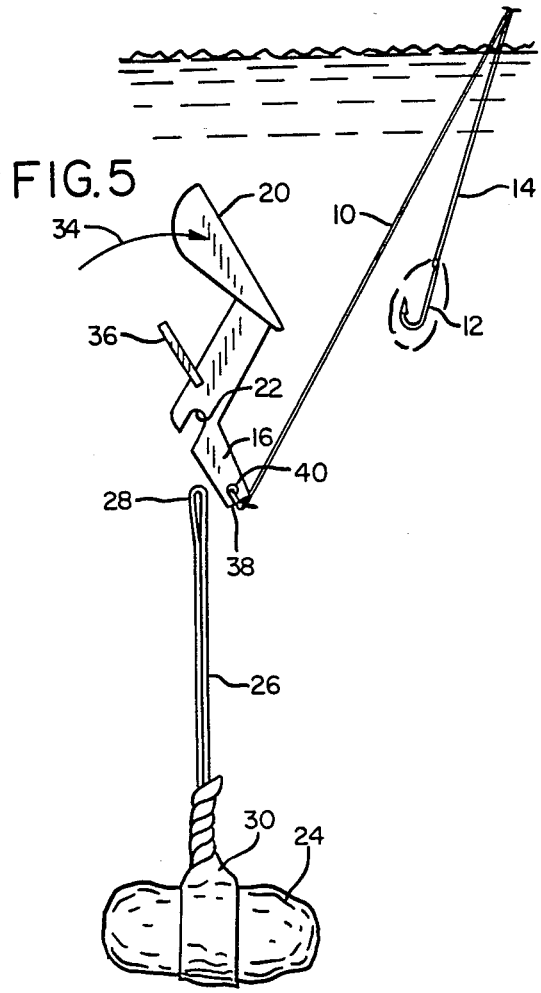
FIG. 5 is a view showing the release function of the FIG. 4 arrangement in submerged position.

With particular reference first to FIGS. 1 and 4, the present casting aid as manufactured has the important feature that it is either disposable, namely, it is releasably attached to the fish hook FIGS. 1-3, and releases when submerged, or it is non-disposable wherein it is tied to the fishing line 10 with the hook 12 connected to a leader 14, FIGS. 4 and 5. The casting aid as manufactured would assume the structure of FIG. 1, namely, the rear section would be intact and according to the desire of the user, such rear section could remain intact or be broken off.

In its construction, the casting aid includes an elongated body member 16 having an angular shape as viewed from the side to form a rearwardly extending tail portion 16a having an upwardly and forwardly turned hook portion 18 and a forwardly extending portion 16b that angles upwardly and terminates at its forward end in a buoyant member 20. Hook 18 is arranged to be releasably engaged by a baited hook 12.

The body member 16 has a slot 22 extending up from its bottom edge which is substantially parallel with the angled arm 16b but obliquely angled with relation to the main body member 16. The casting aid is used with a weight 24 to which a bridle 26 is secured having a looped end 28 arranged to releasably engage the slot 22 of the body member 16. The weight simply may comprise a small stone or other readily available weight bound to the bridle 26 by tape 30 or the like.

The angular shape of the body member and the connection of the bridle 26 in the oblique slot 22 causes retention of these portions in connected relation to the fishing line during a cast due to the substantial centrifugal forces which are imparted. The aid is shown in a casting position by arrow 32 in FIG. 1. When the device reaches the end of the cast and submerges, the low density buoyant member 20 displaces the higher density water below surface and such rotates the elongated body member according to the arrow 34 in FIG. 3 to cause the hook 18 to disconnect from the fishing line and the loop 28 on the weight bridle to disconnect from the slot 22 in the body member as well. In addition to the shape of the arm 16 and its connection to the fishing line and the connection of the weight to the body member, the buoyant member 20 is of an air foil shape which urges the hook portion 18 to its hooked position during a casting operation, namely; in the direction of arrow 35 in FIG. 1. Thus, under ordinary circumstances the casting aid will not release prematurely and there will be no release of the casting aid while it is in flight. Connection of the hook portion 18 with the fishing line 10 may be made with the fish hook 12 itself as shown or it can be made with any other type of rigging or loop on the line.

Arm 16b of the body member has a forwardly projecting fin or plate 36 that is spaced down from the buoyant member 20 and arranged to serve as an abutment or shield which maintains a spacing between the bridle 26 and the buoyant member 20 during a cast. That is, under certain conditions, such as an improper cast, the bridle 26 may hook over the top of the buoyant member and prevent release of the parts when submerged. The fin 36 maintains the bridle in spaced relation from the buoyant member and insures a foolproof spacing of these members during a cast.

In the structure of FIGS. 1, 2 and 3, the weight is disposable, as is the casting aid itself. As stated hereinbefore, the present invention includes the concept of providing a non-disposable casting aid if such is a desired use. This is accomplished by providing the body member 16 with relieved areas 38 which may comprise one or more side slots and/or bores. Although the body member 16 with the relief portions 38 therein is sufficiently strong to maintain the hook portion 18 of the body member in place for use as a disposable aid, it can be readily broken off by the fisherman. The hook portion 18 is broken off when the fisherman desires to use the aid as a non-disposable one. For this latter purpose, the body member as manufactured is provided with a bore 40 just forward of the relief 38, and when the hook portion 18 is broken off for non-disposable use of the aid, the fishing line 10 is tied to this bore. The weight is disposable with both the FIG. 1 and FIG. 4 uses of the casting aid. Also, with reference to FIG. 4, the casting and release function of the weight are identical to the FIG. 1 form when submerged, namely, the point of attachment of the casting weight constituting a fulcrum about which the buoyant member acts to rotate the body member to release the weight.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A casting aid for attachment to a fishing line, said casting aid comprising
    an elongated body member having forward and rearward ends,
    means on said body member arranged to rotate said body member to an upstanding position when submerged,
    releasable fishing line attaching means at the rearward end of said body member arranged to hold said body member attached to the fishing line during a cast but to release said body member from the fishing line in its said upstanding submerged position,
    a casting weight,
    attaching means intermediate the ends of said body member arranged to attach said casting weight to said body member,
    and auxiliary fishing line attaching means intermediate said rear fishing line attaching means and said weight attaching means arranged for permanent attachment of the casting aid to a fishing line,
    whereby to provide a choice of using the casting aid as a disposable one by attaching the fishing line to said releasable fishing line attaching means and a non-disposable one by attaching the fishing line to said auxiliary fishing line attaching means.

2. The casting aid of claim 1 wherein said weight attaching means is releasable and is arranged to hold said casting weight on said body member during a cast but to release said weight from said body member in said upstanding submerged position.

3. The casting aid of claim 1 including a relief portion in said body member intermediate said auxiliary fishing line attaching means and said rear fishing line attaching means allowing the latter to be broken off in non-disposable use of said casting aid.

4. The casting aid of claim 1 including buoyant means of low density material on said body member arranged to provide said rotation of said body member to its upstanding position when submerged, and abutment means on said body member maintaining said weight means in spaced relation from said buoyant means during a cast.

5. A casting aid for attachment to a fishing line, said casting aid comprising
    an elongated body member having one end attached to a fishing line,
    a buoyant member of low density material located at the other end of said elongated body member and arranged to rotate said body member to an upstanding position when submerged,
    a casting weight,
    a weight line having one end thereof secured to said casting weight and its other end releasably attached to said body member at a point intermediate the ends of said body member,
    said point of releasable attachment of said weight line to said body member constituting a fulcrum about which said buoyant member acts to rotate said body member in the water,
    said releasable attachment providing a connection between said weight line and said body member in a casting position wherein said weight line and body member are extended outwardly by centrifugal force and providing a release of said weight line from said body member when the latter is in a submerged position,
    and a fin on said body member between said buoyant member and said releasable attachment arranged to be engaged by said weight line during a cast to prevent entanglement of said weight line with said buoyant member.

6. The casting aid of claim 5 wherein said buoyant member is of an airfoil shape and is arranged to urge rotation of said body member on said fulcrum in a direction which is generally normal to the direction of casting aid flight and which maintains the weight line in attached position on said body member during a cast.

7. The casting aid of claim 5 including a hook-shaped arm at one end of said body member having releasable attachment to the fishing line and being releasable along with said weight line in the submerged upstanding position of said body member.

8. The casting aid of claim 7 including detaching means between said body member and said arm whereby said arm can be detached and the casting aid used without said arm, and means on said body member for attaching a fish line when said arm has been removed.

9. The casting aid of claim 7 including a cut relief between said body member and said arm whereby said arm can be broken off at said relief and the casting aid used without said arm, and means on said body member for attaching a fish line when said arm has been removed.

10. The casting aid of claim 7 including at least one side relief recess and at least one transverse bore in said body member whereby said arm can be broken off at said relief recess and bore and the casting aid used without said arm, and means on said body member for attaching a fish line when said arm has been removed.

* * * * *